United States Patent
Zhang et al.

(10) Patent No.: US 10,732,070 B2
(45) Date of Patent: Aug. 4, 2020

(54) LOAD-SENSITIVE MULTI-PATH VALVE TESTING DEVICE AND TESTING METHOD

(71) Applicant: Xuzhou University of Technology, Xuzhou, Jiangsu (CN)

(72) Inventors: Lei Zhang, Jiangsu (CN); Chuanhui Huang, Jiangsu (CN); Yan Dong, Jiangsu (CN); Qian Wang, Jiangsu (CN); Lei Liu, Jiangsu (CN)

(73) Assignee: Xuzhou University of Technology, Xuzhou (CN)

(*) Notice: Subject to any disclaimer, the term of this patent is extended or adjusted under 35 U.S.C. 154(b) by 209 days.

(21) Appl. No.: 16/010,511

(22) Filed: Jun. 17, 2018

(65) Prior Publication Data
US 2019/0178746 A1    Jun. 13, 2019

(30) Foreign Application Priority Data
Dec. 11, 2017    (CN) .......................... 2017 1 1307286

(51) Int. Cl.
*G01M 3/28* (2006.01)
*F15B 19/00* (2006.01)
*F16K 37/00* (2006.01)

(52) U.S. Cl.
CPC ........... *G01M 3/2876* (2013.01); *F15B 19/00* (2013.01); *F16K 37/0075* (2013.01)

(58) Field of Classification Search
CPC .......... G01M 3/2876; F16B 19/00–007; F16K 37/0075
See application file for complete search history.

(56) References Cited

U.S. PATENT DOCUMENTS

| | | | |
|---|---|---|---|
| 2008/0245064 A1* | 10/2008 | Livraghi | F15B 11/166 60/422 |
| 2009/0057040 A1* | 3/2009 | Yamada | B62D 11/06 180/6.48 |
| 2009/0057049 A1* | 3/2009 | Yamada | F16H 61/456 180/307 |

(Continued)

FOREIGN PATENT DOCUMENTS

| CN | 103061738 B | 8/2015 |
|---|---|---|
| CN | 204572637 U | 8/2015 |

*Primary Examiner* — Nathaniel J Kolb
(74) *Attorney, Agent, or Firm* — Wayne & Ken, LLC; Tony Hom

(57) ABSTRACT

A load-sensitive multi-path valve testing device includes the first, second, and third pressure sensors connected to the T, P, and LS ports of the load-sensitive multi-path valve; an oil outlet of an electronically controlled variable displacement pump connected to the P port of the load-sensitive multi-path valve via an oil supply pipeline; a first proportional relief valve and a first flow sensor connected on the oil supply pipeline; control oil ports of each commutation linkage respectively connected to a control oil source by two proportional pressure reducing valves; two working oil ports of each commutation linkage respectively connected to an oil tank by two proportional relief valves; flow sensors and pressure sensors arranged on two working oil ports of each commutation linkage. A testing method includes: using the device for pressure loss tests, micro-motion characteristic tests and flow saturation resistant characteristic tests.

7 Claims, 1 Drawing Sheet

(56) References Cited

U.S. PATENT DOCUMENTS

| | | | |
|---|---|---|---|
| 2009/0238696 A1* | 9/2009 | Satake | F16H 61/47 417/34 |
| 2011/0060491 A1* | 3/2011 | Kawasaki | E02F 9/2075 701/22 |
| 2011/0271669 A1* | 11/2011 | Kawasaki | E02F 9/2217 60/414 |
| 2012/0029775 A1* | 2/2012 | Peters | B23K 9/164 701/50 |
| 2012/0224983 A1 | 9/2012 | Yi | |
| 2012/0245782 A1* | 9/2012 | Kawasaki | B60W 10/08 701/22 |
| 2015/0066313 A1* | 3/2015 | Hirozawa | E02F 9/2246 701/50 |
| 2016/0312442 A1* | 10/2016 | Egawa | E02F 9/2267 |
| 2016/0312443 A1* | 10/2016 | Egawa | E02F 9/2217 |

* cited by examiner

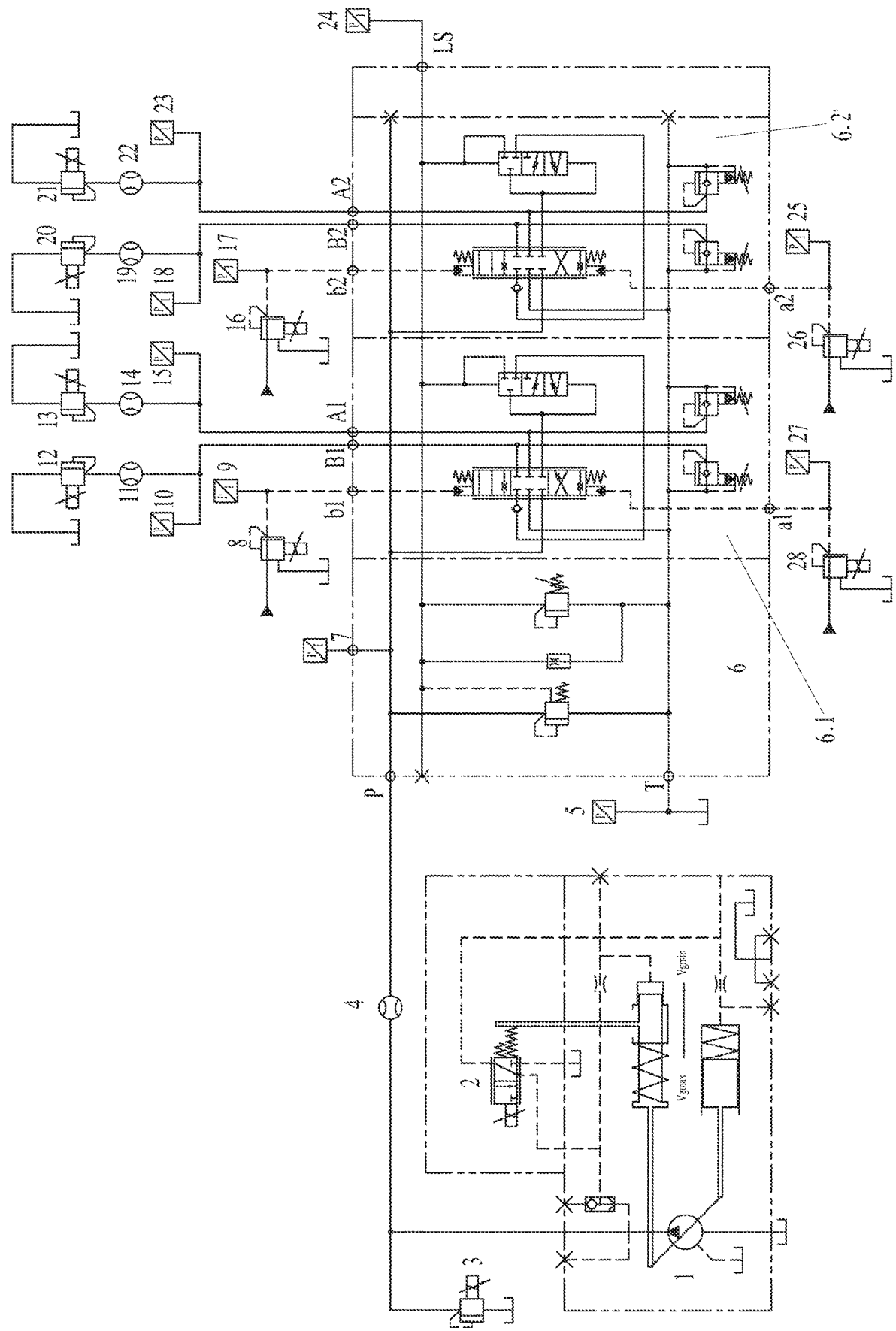

LOAD-SENSITIVE MULTI-PATH VALVE TESTING DEVICE AND TESTING METHOD

FIELD OF THE INVENTION

The invention belongs to the technical field of hydraulic control, in particular to load-sensitive multi-path valve testing device and testing method.

BACKGROUND OF THE INVENTION

The load-sensitive hydraulic system is a hydraulic circuit that senses system pressure and flow requirements and provides only the required flow and pressure, so that the load-sensitive control system has a lower power loss and its efficiency is much higher than that of a conventional hydraulic system. Load-sensitive systems are widely used in hydraulic systems of construction machinery, such as truck cranes, excavators, rotary drilling rigs, and concrete pump trucks. Load-sensitive multi-path valve is one of the important components of the load-sensitive system, and its performance directly affects the power loss, micro-motion characteristic, dynamic characteristic and composite action coordination performance of the load-sensitive system.

The influence of the pressure compensation valve in the load-sensitive multi-path valve is not considered in the pressure loss testing method in the JB/T 8729-2013 "Hydraulic multi-path change valve". The measured pressure loss is the sum of the pressure loss and the pressure difference between the pressure compensators, rather than the true pressure loss, and it is impossible to evaluate the pressure loss characteristic of the load-sensitive multi-path valve. The loading process in the existing pressure loss test is loaded with a manual one-way throttle valve, and the multi-path valve commutation adopts a manual proportional pilot valve control. In this way, the adjustment process is inconvenient, and pressure and flow adjustments of the main pump are manually controlled, and the operation is inconvenient. At the same time, the description of the pressure loss testing method, micro-motion characteristic testing method, and saturation resistant characteristic testing method for multi-path valves in the standard are not detailed, and the accurate acquisition of relevant data cannot be achieved during the actual tests.

SUMMARY OF THE INVENTION

In view of the problems existing in the prior art mentioned above, the present invention provides a load-sensitive multi-path valve testing device which can simultaneously satisfy the test requirements for pressure loss, micro-motion characteristic, and flow saturation resistant characteristic of a load-sensitive multi-path valve. The operation process is convenient, and the test data of pressure loss, micro-motion characteristics, and flow saturation resistant characteristics can be accurately obtained.

In order to achieve the goal mentioned above, the present invention provides a load-sensitive multi-path valve testing device, comprising a load-sensitive multi-path valve, wherein a T port of the load-sensitive multi-path valve is connected to an oil tank via a pipeline, the load-sensitive multi-path valve comprises at least two commutation linkages, and the two commutation linkages are respectively referred to as a first commutation linkage and a second commutation linkage, characterized in that the load-sensitive multi-path valve testing device further comprises a control signal oil source, an electrically controlled variable displacement pump, a first pressure sensor connected to the T port of the load-sensitive multi-path valve, a second pressure sensor connected to a P port of the load-sensitive multi-path valve and a third pressure sensor connected to a load feedback LS port of the load-sensitive multi-path valve;

An oil outlet of the electrically controlled variable displacement pump is connected to the P port of the load-sensitive multi-path valve through an oil supply pipeline, and a first proportional relief valve and a first flow sensor are connected on the oil supply pipeline;

Control oil ports a1, b1 of the first commutation linkage are connected to the control oil source through a fourth proportional pressure reducing valve and a first proportional pressure reducing valve, respectively, working oil ports A1, B1 of the first commutation linkage are connected to the oil tank through a third proportional relief valve and a second proportional relief valve, respectively, a third flow sensor and a fourth pressure sensor are provided on an oil path between the working oil port A1 of the first commutation linkage and the third proportional relief valve, and a second flow sensor and a fifth pressure sensor are provided on an oil path between the working oil port B1 of the first commutation linkage and the second proportional relief valve; a sixth pressure sensor is configured to display a pressure of the b1 port of the load-sensitive multi-path valve; and Control oil ports a2, b2 of the second commutation linkage are connected to the control oil source through a third proportional pressure reducing valve and a second proportional pressure reducing valve, respectively, working oil ports A2, B2 of the second commutation linkage are connected to the oil tank through a fifth proportional relief valve and a fourth proportional relief valve, respectively, a fifth flow sensor and a seventh pressure sensor are provided on an oil path between the working oil port A2 of the second commutation linkage and the fifth proportional relief valve, and a fourth flow sensor and an eighth pressure sensor are provided on an oil path between the working oil port B2 of the second commutation linkage and the fourth proportional relief valve; a ninth pressure sensor is configured to display a pressure of the b2 port of the load-sensitive multi-path valve.

The technical solution adopts an electrically controlled variable displacement pump, which can realize continuous and infinite change of output flow, so that it is more convenient to adjust the flow and pressure during the test. In addition, electronically controlled variable displacement pump PID control can readily achieve constant pressure difference control, and can change the flow of the pump according to the load needs. Because the differential pressure control of the electronically controlled variable displacement pump is more accurate and various valves can be tested under the same pressure difference, which makes the test result more accurate and more comparable. By connecting the two working ports of each commutation linkage to the oil tank through the proportional relief valve, adjustments of the load as well as the pressure thereof can be conveniently made during the test. At the same time, due to the use of a proportional relief valve for loading, the load pressure can be continuously changed, so that the test data is more continuous and authentic. The use of a proportional pressure reducing valve to control the commutation of the load-sensitive multi-path valve enables a continuous incrementally changing force for the commutation linkage, which in turn enables the commutation action to be made smoothly and reliably for the commutation linkage. The device can simultaneously complete the test of the pressure loss, micro-motion characteristic, and flow saturation resistant characteristic of the load-sensitive multi-path valve. The operation process is convenient, and the relevant test data can be obtained accurately, which is favorable for accurate performance assessment for the valve under test.

Further, drain ports of the first proportional pressure reducing valve, the second proportional pressure reducing valve, the third proportional pressure reducing valve and the fourth proportional pressure reducing valve are each connected to the oil tank via a pipeline.

Further, in order to ensure that the control oil source can achieve reliable flow output during the testing process, the control oil source is supplied by an electro-hydraulic proportional pump connected to the oil tank.

Further, in order to achieve control of each proportional valve by controller, the load-sensitive multi-path valve testing device further comprises a controller, the controller being connected with an electro-hydraulic proportional valve built in the electronically controlled variable displacement pump, the first proportional relief valve, the first proportional pressure reducing valve, the second proportional relief valve, the third proportional relief valve, the second proportional pressure reducing valve, the fourth proportional relief valve, the fifth proportional relief valve, the third proportional pressure reducing valve and the fourth proportional pressure reducing valve, respectively.

The present invention further provides a load-sensitive multi-path valve testing method, which is simple to operate, can perform accurate performance test for pressure loss of the load-sensitive multi-path valve, and can facilitates accurate assessment for the load-sensitive multi-path valve.

In order to achieve the goal mentioned above, the present invention provides a load-sensitive multi-path valve testing method, characterized in that the load-sensitive multi-path valve testing method comprises using the load-sensitive multi-channel valve testing device, the specific steps of the load-sensitive multi-path valve testing method being as follows:

S1: compressing springs of pressure compensators of all the commutation linkages of the load-sensitive valve under test to a maximum extent and fixing them by screws, so that the pressure compensators are fully opened;

S2: switching on the electronically controlled variable displacement pump;

S3: performing a pressure loss test on two commutation positions of the first commutation linkage, the specific steps being as follows:

Step 1: increasing a control current of the first proportional relief valve, so that a pressure of the first proportional relief valve is increased to a rated pressure of the load-sensitive multi-path valve;

Step 2: increasing a control current of the fourth proportional pressure reducing valve to a maximum current, so that the first commutation linkage of the load-sensitive multi-path valve under test is fully commutated and hydraulic oil flows from the P port to the A1 port;

Step 3: gradually increasing a control current of the electro-hydraulic proportional valve built in the electronically controlled variable displacement pump, so that a swing angle of the electronically controlled variable displacement pump gradually increases and a flow of the first commutation linkage of the load-sensitive multi-path valve under test gradually increases;

Step 4: recording the flow of the first commutation linkage of the load-sensitive multi-path valve under test which is a value of the third flow sensor, a pressure of the P port of the load-sensitive multi-valve under test which is a value of the second pressure sensor, and a pressure of the A1 port of the load-sensitive multi-path valve under test which is a value of the fourth pressure sensor, respectively;

Step 5: drawing a pressure loss curve presented by the flow of the first commutation linkage of the load-sensitive multi-path valve under test versus a pressure difference between the pressure of the P port and the pressure of the A1 port of the load-sensitive multi-valve under test;

Step 6: adjusting a current value of each of the first proportional relief valve, the fourth proportional pressure reducing valve and the electro-hydraulic proportional valve to be zero;

Step 7: repeating Step 1;

Step 8: increasing a control current of the first proportional pressure reducing valve to a maximum current, so that the first commutation linkage of the load-sensitive multi-path valve under test is fully commutated and hydraulic oil flows from the P port to the B1 port;

Step 9: repeating Step 3;

Step 10: recording the flow of the first commutation linkage of the load-sensitive multi-path valve under test which is a value of the second flow sensor, the pressure of the P port of the load-sensitive multi-valve under test which is a value of the second pressure sensor, and a pressure of the B1 port of the load-sensitive multi-path valve under test which is a value of the fifth pressure sensor, respectively;

Step 11: drawing a pressure loss curve presented by the flow of the first commutation linkage of the load-sensitive multi-path valve under test versus a pressure difference between the pressure of the P port and the pressure of the B1 port of the load-sensitive multi-valve under test;

Step 12: adjusting a current value of each of the first proportional relief valve, the first proportional pressure reducing valve and the electro-hydraulic proportional valve to be zero;

S4: performing a pressure loss test respectively on two commutation positions of other commutation linkages in accordance with the method in S3.

In this method, by compressing the springs of the pressure compensator in the load-sensitive multi-path valve to a maximum extent, the load-sensitive multi-path valve is fully opened, thereby eliminating the influence of the pressure compensation on the pressure loss, so that the pressure loss performance test for the load-sensitive multi-path valve can be accurately performed and the pressure loss performance of the load-sensitive multi-path valve can be accurately assessed.

In order to achieve the goal mentioned above, the present invention provides a load-sensitive multi-path valve testing method, characterized in that the load-sensitive multi-path valve testing method comprises using the load-sensitive multi-channel valve testing device, the specific steps of the load-sensitive multi-path valve testing method being as follows:

S1: switching on the electronically controlled variable displacement pump and gradually increasing a control current of the first proportional relief valve so that an output pressure of the electronically controlled variable displacement pump (1) is a rated pressure of the load-sensitive multi-path valve under test;

S2: adjusting a control current of the electro-hydraulic proportional valve built in the electronically controlled variable displacement pump by PID to control an output flow of the electronically controlled variable displacement pump, so that a pressure difference between an output pressure P of the electronically controlled variable displacement pump and a pressure of the load feedback LS port is a constant pressure difference;

S3: performing a micro-motion characteristic test on two commutation positions of the first commutation linkage, the specific steps being as follows:

Step 1: gradually increasing a control current of the fourth proportional pressure reducing valve so that the first commutation linkage of the load-sensitive multi-path valve under test gradually commutates, and adjusting the third proportional relief valve so that a pressure of the A1 port of the load-sensitive multi-path valve is unloaded;

Step 2: recording a flow of the first commutation linkage of the load-sensitive multi-path valve under test which is a value of the third flow sensor, a pressure of the P port of the load-sensitive multi-valve under test which is a value of the second pressure sensor, a pressure of the A1 port of the load-sensitive multi-path valve under test which is a value of the fourth pressure sensor, a pressure of the load feedback LS port of the load-sensitive multi-valve under test which is a value of the third pressure sensor, and a pressure of the a1 port of the load-sensitive multi-path valve under test which is a value of a tenth pressure sensor, respectively;

Step 3: drawing curves presented by the pressure of the a1 port of the load-sensitive multi-valve under test versus the flow of the first commutation linkage, the pressure of the P port, the pressure of the A1 port and the pressure of the load feedback LS port of the load-sensitive multi-valve under test, respectively;

Step 4: adjusting a control current of the fourth proportional pressure reducing valve to be zero, so that the first commutation linkage of the load-sensitive multi-path valve under test returns to a neutral position;

Step 5: gradually increasing the control current of the fourth proportional pressure reducing valve so that the first commutation linkage of the load-sensitive multi-path valve under test gradually commutates, adjusting the third proportional relief valve so that the pressure of the A1 port of the load-sensitive multi-path valve is 25%, 50%, 75% or 100% of the rated pressure, and repeating step 2 to step 4 once;

Step 6: gradually increasing a control current of the first proportional pressure reducing valve so that the first commutation linkage of the load-sensitive multi-path valve under test gradually commutates, and adjusting the second proportional relief valve so that a pressure of the B1 port of the load-sensitive multi-path valve is unloaded;

Step 7: recording the flow of the first commutation linkage of the load-sensitive multi-path valve under test which is a value of the second flow sensor, the pressure of the P port of the load-sensitive multi-valve under test which is the value of the second pressure sensor, the pressure of the B1 port of the load-sensitive multi-path valve under test which is a value of the fifth pressure sensor, the pressure of the load feedback LS port of the load-sensitive multi-valve under test which is the value of the third pressure sensor, and a pressure of the b1 port of the load-sensitive multi-path valve under test which is the value of the sixth pressure sensor, respectively;

Step 8: drawing curves presented by the pressure of the b1 port of the load-sensitive multi-valve under test versus the flow of the first commutation linkage, the pressure of the P port, the pressure of the B1 port and the pressure of the load feedback LS port of the load-sensitive multi-valve under test, respectively;

Step 9: adjusting the control current of the first proportional pressure reducing valve to be zero, so that the first commutation linkage of the load-sensitive multi-path valve under test returns to a neutral position;

Step 10: gradually increasing the control current of the first proportional pressure reducing valve so that the first commutation linkage of the load-sensitive multi-path valve under test gradually commutates, adjusting the second proportional relief valve so that the pressure of the B1 port of the load-sensitive multi-path valve is 25%, 50%, 75% or 100% of the rated pressure, and repeating step 7 to step 9 once;

S4: performing a micro-motion characteristic test respectively on two commutation positions of other commutation linkages in accordance with the method in S3.

The method has a simple operation process, uses an electrically-controlled variable displacement pump as a power oil source, and adopts PID control to achieve a constant differential pressure control. Since the flow of the electronically controlled variable displacement pump can continuously change according to the needs of the load, the test data in the micro-motion characteristic test is more continuous and authentic, which in turn can improve the accuracy of the micro-motion characteristic test and help to accurately obtain the micro-motion characteristic of the load-sensitive multi-path valve.

In order to achieve the goal mentioned above, the present invention provides a load-sensitive multi-path valve testing method, characterized in that the load-sensitive multi-path valve testing method comprises using the load-sensitive multi-channel valve testing device, the specific steps of the load-sensitive multi-path valve testing method being as follows:

S1: switching on the electronically controlled variable displacement pump and gradually increasing a control current of the first proportional relief valve so that an output pressure of the electronically controlled variable displacement pump is a rated pressure of the load-sensitive multi-path valve under test;

S2: adjusting a control current of the electro-hydraulic proportional valve built in the electronically controlled variable displacement pump by PID to control the output flow of the electronically controlled variable displacement pump, so that a pressure difference between an output pressure P of the electronically controlled variable displacement pump and a pressure of the load feedback LS port is a constant pressure difference, and at the same time limiting a maximum output flow of the electronically controlled variable displacement pump to be lower than a rated flow of the load-sensitive multi-path valve under test;

S3: performing a flow saturation resistant characteristic test on two commutation positions of the first commutation linkage, the specific steps being as follows:

Step 1: adjusting a control current of the fourth proportional pressure reducing valve to a maximum current so that the first commutation linkage of the load-sensitive multi-valve under test is fully commutated, adjusting a control current of the third proportional relief valve so that a pressure of the A1 port of the load-sensitive multi-path valve is unloaded, gradually increasing a control current of the third proportional pressure reducing valve so that the second commutation linkage of the load-sensitive multi-valve under test gradually commutates, and adjusting the fifth proportional relief valve so that the pressure of the A2 port of the load-sensitive multi-path valve is unloaded, 25%, 50%, 75% or 100% of the rated pressure for testing;

Step 2: recording a flow of the A1 port of the load-sensitive multi-path valve under test which is a value of the third flow sensor, a pressure of the P port of the load-sensitive multi-valve under test which is a value of the second pressure sensor, a pressure of the A1 port of the load-sensitive multi-path valve under test which is a value of the fourth pressure sensor, a pressure of the load feedback LS port of the load-sensitive multi-valve under test which is a value of the third pressure sensor, a flow of the A2 port of the load-sensitive multi-valve under test which is a value of the fourth flow sensor, a pressure of the A2 port of the load-sensitive multi-path valve under test which is a value of the seventh pressure sensor, and a pressure of the a2 port of the load-sensitive multi-path valve under test which is a value of an eleventh pressure sensor, respectively;

Step 3: drawing curves presented by the pressure of the a2 port of the load-sensitive multi-valve under test versus the pressure of the P port, the pressure of the load feedback LS port, the flow of the A1 port, the pressure of the A1 port, the flow of the A2 port and the pressure of the A2 port of the load-sensitive multi-valve under test, respectively.

Step 4: adjusting a control current of the third proportional pressure reducing valve to a maximum current so that the second commutation linkage of the load-sensitive multi-valve under test is fully commutated, adjusting a control current of the fifth proportional relief valve so that a pressure of the A2 port of the load-sensitive multi-path valve is unloaded, gradually increasing a control current of the fourth proportional pressure reducing valve so that the first commutation linkage of the load-sensitive multi-valve under test gradually commutates, and adjusting the third proportional relief valve so that the pressure of the A1 port of the load-sensitive multi-path valve is unloaded, 25%, 50%, 75% or 100% of the rated pressure for testing;

Step 5: recording the flow of the A1 port of the load-sensitive multi-path valve under test which is a value of the third flow sensor, the pressure of the P port of the load-sensitive multi-valve under test which is a value of the second pressure sensor, the pressure of the A1 port of the load-sensitive multi-path valve under test which is a value of the fourth pressure sensor, the pressure of the load feedback LS port of the load-sensitive multi-valve under test which is a value of the third pressure sensor, the flow of the A2 port of the load-sensitive multi-valve under test which is a value of the fourth flow sensor, the pressure of the A2 port of the load-sensitive multi-path valve under test which is a value of the seventh pressure sensor, and the pressure of the a1 port of the load-sensitive multi-path valve under test which is a value of the eleventh pressure sensor, respectively;

Step 6: drawing curves presented by the pressure of the a1 port of the load-sensitive multi-valve under test versus the pressure of the P port, the pressure of the load feedback LS port, the flow of the A1 port, the pressure of the A1 port, the flow of the A2 port and the pressure of the A2 port of the load-sensitive multi-valve under test, respectively.

The method uses a proportional relief valve to load, so that the load pressure can be continuously changed. At the same time, proportional pressure reducing valve is used to control the commutation of the load-sensitive multi-path valve, so that the load-sensitive multi-path valve can have a force exerted thereon that is continuously incremented. Therefore, commutation can be achieved in a continuous and smooth way, which can improve the accuracy of the saturation resistant characteristic test data and help to accurately obtain the saturation resistant characteristic of the load-sensitive multi-path valve.

BRIEF DESCRIPTION OF THE DRAWINGS

FIGURE is a hydraulic schematic diagram of the present invention.

1: electronically controlled variable displacement pump; 2: electro-hydraulic proportional valve; 3: first proportional relief valve; 4: first flow sensor; 5: first pressure sensor; 6: load-sensitive multi-path valve; 6.1: first commutation linkage; 6.2: second commutation linkage; 7: second pressure sensor; 8: first proportional pressure reducing valve; 9: sixth pressure sensor; 10: fifth pressure sensor: 11: second flow sensor; 12: second proportional relief valve: 13: third proportional relief valve; 14: third flow sensor; 15: fourth pressure sensor; 16: second proportional pressure reducing valve; 17: ninth pressure sensor; 18: eighth pressure sensor; 19: fourth flow sensor; 20: fourth proportional relief valve; 21: fifth proportional relief valve; 22: fourth flow sensor; 23: seventh pressure sensor; 24: third pressure sensor; 25: eleventh pressure sensor; 26: third proportional pressure reducing valve; 27: tenth pressure sensor; 28: fourth proportional pressure reducing valve.

DETAILED DESCRIPTION OF ILLUSTRATED EMBODIMENTS

The present invention is described in detail in the following.

As shown in the FIGURE, the present invention provides a load-sensitive multi-path valve testing device, comprising a load-sensitive multi-path valve (6), wherein a T port of the load-sensitive multi-path valve (6) is connected to an oil tank via a pipeline, the load-sensitive multi-path valve (6) comprises at least two commutation linkages, and the two commutation linkages are respectively referred to as a first commutation linkage (6.1) and a second commutation linkage (6.2), characterized in that the load-sensitive multi-path valve testing device further comprises a control signal oil source, an electrically controlled variable displacement pump (1), a first pressure sensor (5) connected to the T port of the load-sensitive multi-path valve (6), a second pressure sensor (7) connected to a P port of the load-sensitive multi-path valve (6) and a third pressure sensor (24) connected to a load feedback LS port of the load-sensitive multi-path valve (6);

An oil outlet of the electrically controlled variable displacement pump (1) is connected to the P port of the load-sensitive multi-path valve (6) through an oil supply pipeline, and a first proportional relief valve (3) and a first flow sensor (4) are connected on the oil supply pipeline;

Control oil ports a1, b1 of the first commutation linkage (6.1) are connected to the control oil source through a fourth proportional pressure reducing valve (28) and a first proportional pressure reducing valve (8), respectively, working oil ports A1, B1 of the first commutation linkage (6.1) are connected to the oil tank through a third proportional relief valve (13) and a second proportional relief valve (12), respectively, a third flow sensor (14) and a fourth pressure sensor (15) are provided on an oil path between the working oil port A1 of the first commutation linkage (6.1) and the third proportional relief valve (13), and a second flow sensor (11) and a fifth pressure sensor (10) are provided on an oil path between the working oil port B1 of the first commutation linkage (6.1) and the second proportional relief valve (12); a sixth pressure sensor (9) is configured to display a pressure of the b1 port of the load-sensitive multi-path valve (6); and Control oil ports a2, b2 of the second commutation linkage (6.2) are connected to the control oil source through a third proportional pressure reducing valve (26) and a second proportional pressure reducing valve (16), respectively, working oil ports A2, B2 of the second commutation linkage (6.2) are connected to the oil tank through a fifth proportional relief valve (21) and a fourth proportional relief valve (20), respectively, a fifth flow sensor (22) and a seventh pressure sensor (23) are provided on an oil path between the working oil port A2 of the second commutation linkage (6.2) and the fifth proportional relief valve (21), and a fourth flow sensor (19) and an eighth pressure sensor (18) are provided on an oil path between the working oil port B2 of the second commutation linkage (6.2) and the fourth proportional relief valve (20); a ninth pressure sensor (17) is configured to display a pressure of the b2 port of the load-sensitive multi-path valve (6).

Drain ports of the first proportional pressure reducing valve (8), the second proportional pressure reducing valve (16), the third proportional pressure reducing valve (26) and the fourth proportional pressure reducing valve (28) are each connected to the oil tank via a pipeline.

In order to ensure that the control oil source can achieve reliable flow output during the testing process, the control oil source is supplied by an electro-hydraulic proportional pump connected to the oil tank.

In order to achieve control of each proportional valve by controller, the load-sensitive multi-path valve testing device further comprises a controller, the controller being connected with an electro-hydraulic proportional valve (2) built in the electronically controlled variable displacement pump (1), the first proportional relief valve (3), the first proportional pressure reducing valve (8), the second proportional relief valve (12), the third proportional relief valve (13), the second proportional pressure reducing valve (16), the fourth proportional relief valve (20), the fifth proportional relief valve (21), the third proportional pressure reducing valve (26) and the fourth proportional pressure reducing valve (28), respectively.

The technical solution adopts an electrically controlled variable displacement pump, which can realize continuous and infinite change of output flow, so that it is more convenient to adjust the flow and pressure during the test. In addition, electronically controlled variable displacement pump PID control can readily achieve constant pressure difference control, and can change the flow of the pump according to the load needs. Because the differential pressure control of the electronically controlled variable displacement pump is more accurate and various valves can be tested under the same pressure difference, which makes the test result more accurate and more comparable. By connecting the two working ports of each commutation linkage to the oil tank through the proportional relief valve, adjustments of the load as well as the pressure thereof can be conveniently made during the test. At the same time, due to the use of a proportional relief valve for loading, the load pressure can be continuously changed, so that the test data is more continuous and authentic. The use of a proportional pressure reducing valve to control the commutation of the load-sensitive multi-path valve enables a continuous incrementally changing force for the commutation linkage, which in turn enables the commutation action to be made smoothly and reliably for the commutation linkage. The device can simultaneously complete the test of the pressure loss, micro-motion characteristic, and flow saturation resistant characteristic of the load-sensitive multi-path valve. The operation process is convenient, and the relevant test data can be obtained accurately, which is favorable for accurate performance assessment for the valve under test.

The present invention further provides a load-sensitive multi-path valve testing method, which is simple to operate, can perform accurate performance test for pressure loss of the load-sensitive multi-path valve, and can facilitates accurate assessment for the load-sensitive multi-path valve.

In order to achieve the goal mentioned above, the present invention provides a load-sensitive multi-path valve testing method, characterized in that the load-sensitive multi-path valve testing method comprises using the load-sensitive multi-channel valve testing device, the specific steps of the load-sensitive multi-path valve testing method being as follows:

S1: compressing springs of pressure compensators of all the commutation linkages of the load-sensitive valve (6) under test to a maximum extent and fixing them by screws, so that the pressure compensators are fully opened;

S2: switching on the electronically controlled variable displacement pump (1);

S3: performing a pressure loss test on two commutation positions of the first commutation linkage (6.1), the specific steps being as follows:

Step 1: increasing a control current of the first proportional relief valve (3), so that a pressure of the first proportional relief valve (3) is increased to a rated pressure of the load-sensitive multi-path valve (6);

Step 2: increasing a control current of the fourth proportional pressure reducing valve (28) to a maximum current, so that the first commutation linkage (6.1) of the load-sensitive multi-path valve (6) under test is fully commutated and hydraulic oil flows from the P port to the A1 port;

Step 3: gradually increasing a control current of the electro-hydraulic proportional valve (2) built in the electronically controlled variable displacement pump (1), so that a swing angle of the electronically controlled variable displacement pump (1) gradually increases and a flow of the first commutation linkage (6.1) of the load-sensitive multi-path valve (6) under test gradually increases;

Step 4: recording the flow of the first commutation linkage (6.1) of the load-sensitive multi-path valve (6) under test which is a value of the third flow sensor (14), a pressure of the P port of the load-sensitive multi-valve (6) under test which is a value of the second pressure sensor (7), and a pressure of the A1 port of the load-sensitive multi-path valve (6) under test which is a value of the fourth pressure sensor (15), respectively;

Step 5: drawing a pressure loss curve presented by the flow of the first commutation linkage (6.1) of the load-sensitive multi-path valve (6) under test versus a pressure difference between the pressure of the P port and the pressure of the A1 port of the load-sensitive multi-valve (6) under test;

Step 6: adjusting a current value of each of the first proportional relief valve (3), the fourth proportional pressure reducing valve (28) and the electro-hydraulic proportional valve (2) to be zero;

Step 7: repeating Step 1;

Step 8: increasing a control current of the first proportional pressure reducing valve (8) to a maximum current, so that the first commutation linkage (6.1) of the load-sensitive multi-path valve (6) under test is fully commutated and hydraulic oil flows from the P port to the B1 port;

Step 9: repeating Step 3;

Step 10: recording the flow of the first commutation linkage (6.1) of the load-sensitive multi-path valve (6) under test which is a value of the second flow sensor (11), the pressure of the P port of the load-sensitive multi-valve (6) under test which is a value of the second pressure sensor (7), and a pressure of the B1 port of the load-sensitive multi-path valve (6) under test which is a value of the fifth pressure sensor (10), respectively;

Step 11: drawing a pressure loss curve presented by the flow of the first commutation linkage (6.1) of the load-sensitive multi-path valve (6) under test versus a pressure difference between the pressure of the P port and the pressure of the B1 port of the load-sensitive multi-valve (6) under test;

Step 12: adjusting a current value of each of the first proportional relief valve (3), the first proportional pressure reducing valve (8) and the electro-hydraulic proportional valve (2) to be zero;

S4: performing a pressure loss test respectively on two commutation positions of other commutation linkages in accordance with the method in S3.

In this method, by compressing the springs of the pressure compensator in the load-sensitive multi-path valve to a maximum extent, the load-sensitive multi-path valve is fully opened, thereby eliminating the influence of the pressure compensation on the pressure loss, so that the pressure loss performance test for the load-sensitive multi-path valve can be accurately performed and the pressure loss performance of the load-sensitive multi-path valve can be accurately assessed.

In order to achieve the goal mentioned above, the present invention provides a load-sensitive multi-path valve testing method, characterized in that the load-sensitive multi-path valve testing method comprises using the load-sensitive multi-channel valve testing device, the specific steps of the load-sensitive multi-path valve testing method being as follows:

S1: switching on the electronically controlled variable displacement pump (1) and gradually increasing a control current of the first proportional relief valve (3) so that an output pressure of the electronically controlled variable displacement pump (1) is a rated pressure of the load-sensitive multi-path valve (6) under test;

S2: adjusting a control current of the electro-hydraulic proportional valve (2) built in the electronically controlled variable displacement pump (1) by PID to control an output flow of the electronically controlled variable displacement pump (1), so that a pressure difference between an output pressure P of the electronically controlled variable displacement pump (1) and a pressure of the load feedback LS port is a constant pressure difference;

S3: performing a micro-motion characteristic test on two commutation positions of the first commutation linkage (6.1), the specific steps being as follows:

Step 1: gradually increasing a control current of the fourth proportional pressure reducing valve (28) so that the first commutation linkage (6.1) of the load-sensitive multi-path valve (6) under test gradually commutates, and adjusting the third proportional relief valve (13) so that a pressure of the A1 port of the load-sensitive multi-path valve (6) is unloaded;

Step 2: recording a flow of the first commutation linkage (6.1) of the load-sensitive multi-path valve (6) under test which is a value of the third flow sensor (14), a pressure of the P port of the load-sensitive multi-valve (6) under test which is a value of the second pressure sensor (7), a pressure of the A1 port of the load-sensitive multi-path valve (6) under test which is a value of the fourth pressure sensor (15), a pressure of the load feedback LS port of the load-sensitive multi-valve (6) under test which is a value of the third pressure sensor (24), and a pressure of the a1 port of the load-sensitive multi-path valve (6) under test which is a value of a tenth pressure sensor (27), respectively;

Step 3: drawing curves presented by the pressure of the a1 port of the load-sensitive multi-valve (6) under test versus the flow of the first commutation linkage (6.1), the pressure of the P port, the pressure of the A1 port and the pressure of the load feedback LS port of the load-sensitive multi-valve (6) under test, respectively;

Step 4: adjusting a control current of the fourth proportional pressure reducing valve (28) to be zero, so that the first commutation linkage (6.1) of the load-sensitive multi-path valve (6) under test returns to a neutral position;

Step 5: gradually increasing the control current of the fourth proportional pressure reducing valve (28) so that the first commutation linkage (6.1) of the load-sensitive multi-path valve (6) under test gradually commutates, adjusting the third proportional relief valve (13) so that the pressure of the A1 port of the load-sensitive multi-path valve (6) is 25%, 50%, 75% or 100% of the rated pressure, and repeating step 2 to step 4 once;

Step 6: gradually increasing a control current of the first proportional pressure reducing valve (8) so that the first commutation linkage (6.1) of the load-sensitive multi-path valve (6) under test gradually commutates, and adjusting the second proportional relief valve (12) so that a pressure of the B1 port of the load-sensitive multi-path valve (6) is unloaded;

Step 7: recording the flow of the first commutation linkage (6.1) of the load-sensitive multi-path valve (6) under test which is a value of the second flow sensor (11), the pressure of the P port of the load-sensitive multi-valve (6) under test which is the value of the second pressure sensor (7), the pressure of the B1 port of the load-sensitive multi-path valve (6) under test which is a value of the fifth pressure sensor (10), the pressure of the load feedback LS port of the load-sensitive multi-valve (6) under test which is the value of the third pressure sensor (24), and a pressure of the b1 port of the load-sensitive multi-path valve (6) under test which is the value of the sixth pressure sensor (9), respectively;

Step 8: drawing curves presented by the pressure of the b1 port of the load-sensitive multi-valve (6) under test versus the flow of the first commutation linkage (6.1), the pressure of the P port, the pressure of the B1 port and the pressure of the load feedback LS port of the load-sensitive multi-valve (6) under test, respectively;

Step 9: adjusting the control current of the first proportional pressure reducing valve (8) to be zero, so that the first commutation linkage (6.1) of the load-sensitive multi-path valve (6) under test returns to a neutral position;

Step 10: gradually increasing the control current of the first proportional pressure reducing valve (8) so that the first commutation linkage (6.1) of the load-sensitive multi-path valve (6) under test gradually commutates, adjusting the second proportional relief valve (12) so that the pressure of the B1 port of the load-sensitive multi-path valve (6) is 25%, 50%, 75% or 100% of the rated pressure, and repeating step 7 to step 9 once;

S4: performing a micro-motion characteristic test respectively on two commutation positions of other commutation linkages in accordance with the method in S3.

The method has a simple operation process, uses an electrically-controlled variable displacement pump as a power oil source, and adopts PID control to achieve a constant differential pressure control. Since the flow of the electronically controlled variable displacement pump can continuously change according to the needs of the load, the test data in the micro-motion characteristic test is more continuous and authentic, which in turn can improve the accuracy of the micro-motion characteristic test and help to accurately obtain the micro-motion characteristic of the load-sensitive multi-path valve.

In order to achieve the goal mentioned above, the present invention provides a load-sensitive multi-path valve testing method, characterized in that the load-sensitive multi-path valve testing method comprises using the load-sensitive multi-channel valve testing device, the specific steps of the load-sensitive multi-path valve testing method being as follows:

S1: switching on the electronically controlled variable displacement pump (1) and gradually increasing a control current of the first proportional relief valve (3) so that an output pressure of the electronically controlled variable displacement pump (1) is a rated pressure of the load-sensitive multi-path valve (6) under test;

S2: adjusting a control current of the electro-hydraulic proportional valve (2) built in the electronically controlled variable displacement pump (1) by PID to control the output flow of the electronically controlled variable displacement pump (1), so that a pressure difference between an output pressure P of the electronically controlled variable displacement pump (1) and a pressure of the load feedback LS port is a constant pressure difference, and at the same time limiting a maximum output flow of the electronically controlled variable displacement pump (1) to be lower than a rated flow of the load-sensitive multi-path valve (6) under test;

S3: performing a flow saturation resistant characteristic test on two commutation positions of the first commutation linkage (6.1), the specific steps being as follows:

Step 1: adjusting a control current of the fourth proportional pressure reducing valve (28) to a maximum current so that the first commutation linkage (6.1) of the load-sensitive multi-valve (6) under test is fully commutated, adjusting a control current of the third proportional relief valve (13) so that a pressure of the A1 port of the load-sensitive multi-path valve (6) is unloaded, gradually increasing a control current of the third proportional pressure reducing valve (26) so that the second commutation linkage (6.2) of the load-sensitive multi-valve (6) under test gradually commutates, and adjusting the fifth proportional relief valve (21) so that the pressure of the A2 port of the load-sensitive multi-path valve (6) is unloaded, 25%, 50%, 75% or 100% of the rated pressure for testing;

Step 2: recording a flow of the A1 port of the load-sensitive multi-path valve (6) under test which is a value of the third flow sensor (14), a pressure of the P port of the load-sensitive multi-valve (6) under test which is a value of the second pressure sensor (7), a pressure of the A1 port of the load-sensitive multi-path valve (6) under test which is a value of the fourth pressure sensor (15), a pressure of the load feedback LS port of the load-sensitive multi-valve (6) under test which is a value of the third pressure sensor (24), a flow of the A2 port of the load-sensitive multi-valve (6) under test which is a value of the fourth flow sensor (22), a pressure of the A2 port of the load-sensitive multi-path valve (6) under test which is a value of the seventh pressure sensor (23), and a pressure of the a2 port of the load-sensitive multi-path valve (6) under test which is a value of an eleventh pressure sensor (25), respectively;

Step 3: drawing curves presented by the pressure of the a2 port of the load-sensitive multi-valve (6) under test versus the pressure of the P port, the pressure of the load feedback LS port, the flow of the A1 port, the pressure of the A1 port, the flow of the A2 port and the pressure of the A2 port of the load-sensitive multi-valve (6) under test, respectively.

Step 4: adjusting a control current of the third proportional pressure reducing valve (26) to a maximum current so that the second commutation linkage (6.2) of the load-sensitive multi-valve (6) under test is fully commutated, adjusting a control current of the fifth proportional relief valve (21) so that a pressure of the A2 port of the load-sensitive multi-path valve (6) is unloaded, gradually increasing a control current of the fourth proportional pressure reducing valve (28) so that the first commutation linkage (6.1) of the load-sensitive multi-valve (6) under test gradually commutates, and adjusting the third proportional relief valve (13) so that the pressure of the A1 port of the load-sensitive multi-path valve (6) is unloaded, 25%, 50%, 75% or 100% of the rated pressure for testing;

Step 5: recording the flow of the A1 port of the load-sensitive multi-path valve (6) under test which is a value of the third flow sensor (14), the pressure of the P port of the load-sensitive multi-valve (6) under test which is a value of the second pressure sensor (7), the pressure of the A1 port of the load-sensitive multi-path valve (6) under test which is a value of the fourth pressure sensor (15), the pressure of the load feedback LS port of the load-sensitive multi-valve (6) under test which is a value of the third pressure sensor (24), the flow of the A2 port of the load-sensitive multi-valve (6) under test which is a value of the fourth flow sensor (22), the pressure of the A2 port of the load-sensitive multi-path valve (6) under test which is a value of the seventh pressure sensor (23), and the pressure of the a1 port of the load-sensitive multi-path valve (6) under test which is a value of the eleventh pressure sensor (25), respectively;

Step 6: drawing curves presented by the pressure of the a1 port of the load-sensitive multi-valve (6) under test versus the pressure of the P port, the pressure of the load feedback LS port, the flow of the A1 port, the pressure of the A1 port, the flow of the A2 port and the pressure of the A2 port of the load-sensitive multi-valve (6) under test, respectively.

The method uses a proportional relief valve to load, so that the load pressure can be continuously changed. At the same time, proportional pressure reducing valve is used to control the commutation of the load-sensitive multi-path valve, so that the load-sensitive multi-path valve can have a force exerted thereon that is continuously incremented. Therefore, commutation can be achieved in a continuous and smooth way, which can improve the accuracy of the saturation resistant characteristic test data and help to accurately obtain the saturation resistant characteristic of the load-sensitive multi-path valve.

While the invention has been described in connection with what are presently considered to be the most practical and preferred embodiments, it is to be understood that the invention is not limited to the disclosed embodiments, but on the contrary, is intended to cover various modifications and equivalent arrangements included within the spirit and scope of the invention.

What is claimed is:

1. A load-sensitive multi-path valve testing device comprising a load-sensitive multi-path valve (6), wherein a T port of the load-sensitive multi-path valve (6) is connected to an oil tank via a pipeline, the load-sensitive multi-path valve (6) comprises at least two commutation linkages, and the two commutation linkages are respectively referred to as a first commutation linkage (6.1) and a second commutation linkage (6.2), characterized in that the load-sensitive multi-path valve testing device further comprises a control signal oil source, an electrically controlled variable displacement pump (1), a first pressure sensor (5) connected to the T port of the load-sensitive multi-path valve (6), a second pressure sensor (7) connected to a P port of the load-sensitive multi-path valve (6) and a third pressure sensor (24) connected to a load feedback LS port of the load-sensitive multi-path valve (6);

an oil outlet of the electrically controlled variable displacement pump (1) is connected to the P port of the load-sensitive multi-path valve (6) through an oil supply pipeline, and a first proportional relief valve (3) and a first flow sensor (4) are connected on the oil supply pipeline;

control oil ports a1, b1 of the first commutation linkage (6.1) are connected to the control oil source through a fourth proportional pressure reducing valve (28) and a first proportional pressure reducing valve (8), respectively, working oil ports A1, B1 of the first commutation linkage (6.1) are connected to the oil tank through a third proportional relief valve (13) and a second proportional relief valve (12), respectively, a third flow sensor (14) and a fourth pressure sensor (15) are provided on an oil path between the working oil port A1 of the first commutation linkage (6.1) and the third proportional relief valve (13), and a second flow sensor (11) and a fifth pressure sensor (10) are provided on an oil path between the working oil port B1 of the first commutation linkage (6.1) and the second proportional relief valve (12); a sixth pressure sensor (9) is configured to display a pressure of the b 1 port of the load-sensitive multi-path valve (6); and control oil ports a2, b2 of the second commutation linkage (6.2) are connected to the control oil source through a third proportional pressure reducing valve (26) and a second proportional pressure reducing valve (16), respectively, working oil ports A2, B2 of the second commutation linkage (6.2) are connected to the oil tank through a fifth proportional relief valve (21) and a fourth proportional relief valve (20), respectively, a fifth flow sensor (22) and a seventh pressure sensor (23) are provided on an oil path between the working oil port A2 of the second commutation linkage (6.2) and the fifth proportional relief valve (21), and a fourth flow sensor (19) and an eighth pressure sensor (18) are provided on an oil path between the working oil port B2 of the second commutation linkage (6.2) and the fourth proportional relief valve (20); a ninth pressure sensor (17) is configured to display a pressure of the b2 port of the load-sensitive multi-path valve (6).

2. The load-sensitive multi-path valve testing device according to claim 1, characterized in that drain ports of the first proportional pressure reducing valve (8), the second proportional pressure reducing valve (16), the third proportional pressure reducing valve (26) and the fourth proportional pressure reducing valve (28) are each connected to the oil tank via a pipeline.

3. The load-sensitive multiplex valve testing device according to claim 1 or claim 2, characterized in that the control oil source is supplied by an electro-hydraulic proportional pump connected to the oil tank.

4. The load-sensitive multi-path valve testing device according to claim 3, characterized in that the load-sensitive multi-path valve testing device further comprises a controller, the controller being connected with an electro-hydraulic proportional valve (2) built in the electronically controlled variable displacement pump (1), the first proportional relief valve (3), the first proportional pressure reducing valve (8), the second proportional relief valve (12), the third proportional relief valve (13), the second proportional pressure reducing valve (16), the fourth proportional relief valve (20), the fifth proportional relief valve (21), the third proportional pressure reducing valve (26) and the fourth proportional pressure reducing valve (28), respectively.

5. A load-sensitive multi-path valve testing method, characterized in that the load-sensitive multi-path valve testing method comprises using the load-sensitive multi-channel valve testing device according to any one of claims 1 to 4, the specific steps of the load-sensitive multi-path valve testing method being as follows:

S1: compressing springs of pressure compensators of all the commutation linkages of the load-sensitive valve (6) under test to a maximum extent and fixing them by screws, so that the pressure compensators are fully opened;

S2: switching on the electronically controlled variable displacement pump (1);

S3: performing a pressure loss test on two commutation positions of the first commutation linkage (6.1), the specific steps being as follows:

Step 1: increasing a control current of the first proportional relief valve (3), so that a pressure of the first proportional relief valve (3) is increased to a rated pressure of the load-sensitive multi-path valve (6);

Step 2: increasing a control current of the fourth proportional pressure reducing valve (28) to a maximum current, so that the first commutation linkage (6.1) of the load-sensitive multi-path valve (6) under test is fully commutated and hydraulic oil flows from the P port to the A1 port;

Step 3: gradually increasing a control current of the electro-hydraulic proportional valve (2) built in the electronically controlled variable displacement pump (1), so that a swing angle of the electronically controlled variable displacement pump (1) gradually increases and a flow of the first commutation linkage (6.1) of the load-sensitive multi-path valve (6) under test gradually increases;

Step 4: recording the flow of the first commutation linkage (6.1) of the load-sensitive multi-path valve (6) under test which is a value of the third flow sensor (14), a pressure of the P port of the load-sensitive multi-valve (6) under test which is a value of the second pressure sensor (7), and a pressure of the A1 port of the load-sensitive multi-path valve (6) under test which is a value of the fourth pressure sensor (15), respectively;

Step 5: drawing a pressure loss curve presented by the flow of the first commutation linkage (6.1) of the load-sensitive multi-path valve (6) under test versus a pressure difference between the pressure of the P port and the pressure of the A1 port of the load-sensitive multi-valve (6) under test;

Step 6: adjusting a current value of each of the first proportional relief valve (3), the fourth proportional pressure reducing valve (28) and the electro-hydraulic proportional valve (2) to be zero;

Step 7: repeating Step 1;

Step 8: increasing a control current of the first proportional pressure reducing valve (8) to a maximum current, so that the first commutation linkage (6.1) of the load-sensitive multi-path valve (6) under test is fully commutated and hydraulic oil flows from the P port to the B1 port;

Step 9: repeating Step 3;

Step 10: recording the flow of the first commutation linkage (6.1) of the load-sensitive multi-path valve (6) under test which is a value of the second flow sensor (11), the pressure of the P port of the load-sensitive multi-valve (6) under test which is a value of the second pressure sensor (7), and a pressure of the B1 port of the load-sensitive multi-path valve (6) under test which is a value of the fifth pressure sensor (10), respectively;

Step 11: drawing a pressure loss curve presented by the flow of the first commutation linkage (6.1) of the load-sensitive multi-path valve (6) under test versus a pressure difference between the pressure of the P port and the pressure of the B1 port of the load-sensitive multi-valve (6) under test;

Step 12: adjusting a current value of each of the first proportional relief valve (3), the first proportional pressure reducing valve (8) and the electro-hydraulic proportional valve (2) to be zero;

S4: performing a pressure loss test respectively on two commutation positions of other commutation linkages in accordance with the method in S3.

6. A load-sensitive multi-path valve testing method, characterized in that the load-sensitive multi-path valve testing method comprises a load-sensitive multi-path valve testing device according to any one of claims 1 to 4, the specific steps of the load-sensitive multi-path valve testing method being as follows:

S1: switching on the electronically controlled variable displacement pump (1) and gradually increasing a control current of the first proportional relief valve (3) so that an output pressure of the electronically controlled variable displacement pump (1) is a rated pressure of the load-sensitive multi-path valve (6) under test;

S2: adjusting a control current of the electro-hydraulic proportional valve (2) built in the electronically controlled variable displacement pump (1) by PID to control an output flow of the electronically controlled variable displacement pump (1), so that a pressure difference between an output pressure P of the electronically controlled variable displacement pump (1) and a pressure of the load feedback LS port is a constant pressure difference;

S3: performing a micro-motion characteristic test on two commutation positions of the first commutation linkage (6.1), the specific steps being as follows:

Step 1: gradually increasing a control current of the fourth proportional pressure reducing valve (28) so that the first commutation linkage (6.1) of the load-sensitive multi-path valve (6) under test gradually commutates, and adjusting the third proportional relief valve (13) so that a pressure of the A1 port of the load-sensitive multi-path valve (6) is unloaded;

Step 2: recording a flow of the first commutation linkage (6.1) of the load-sensitive multi-path valve (6) under test which is a value of the third flow sensor (14), a pressure of the P port of the load-sensitive multi-valve (6) under test which is a value of the second pressure sensor (7), a pressure of the A1 port of the load-sensitive multi-path valve (6) under test which is a value of the fourth pressure sensor (15), a pressure of the load feedback LS port of the load-sensitive multi-valve (6) under test which is a value of the third pressure sensor (24), and a pressure of the a1 port of the load-sensitive multi-path valve (6) under test which is a value of a tenth pressure sensor (27), respectively;

Step 3: drawing curves presented by the pressure of the a1 port of the load-sensitive multi-valve (6) under test versus the flow of the first commutation linkage (6.1), the pressure of the P port, the pressure of the A1 port and the pressure of the load feedback LS port of the load-sensitive multi-valve (6) under test, respectively;

Step 4: adjusting a control current of the fourth proportional pressure reducing valve (28) to be zero, so that the first commutation linkage (6.1) of the load-sensitive multi-path valve (6) under test returns to a neutral position;

Step 5: gradually increasing the control current of the fourth proportional pressure reducing valve (28) so that the first commutation linkage (6.1) of the load-sensitive multi-path valve (6) under test gradually commutates, adjusting the third proportional relief valve (13) so that the pressure of the A1 port of the load-sensitive multi-path valve (6) is 25%, 50%, 75% or 100% of the rated pressure, and repeating step 2 to step 4 once;

Step 6: gradually increasing a control current of the first proportional pressure reducing valve (8) so that the first commutation linkage (6.1) of the load-sensitive multi-path valve (6) under test gradually commutates, and adjusting the second proportional relief valve (12) so that a pressure of the B1 port of the load-sensitive multi-path valve (6) is unloaded;

Step 7: recording the flow of the first commutation linkage (6.1) of the load-sensitive multi-path valve (6) under test which is a value of the second flow sensor (11), the pressure of the P port of the load-sensitive multi-valve (6) under test which is the value of the second pressure sensor (7), the pressure of the B1 port of the load-sensitive multi-path valve (6) under test which is a value of the fifth pressure sensor (10), the pressure of the load feedback LS port of the load-sensitive multi-valve (6) under test which is the value of the third pressure sensor (24), and a pressure of the b1 port of the load-sensitive multi-path valve (6) under test which is the value of the sixth pressure sensor (9), respectively;

Step 8: drawing curves presented by the pressure of the b1 port of the load-sensitive multi-valve (6) under test versus the flow of the first commutation linkage (6.1), the pressure of the P port, the pressure of the B1 port and the pressure of the load feedback LS port of the load-sensitive multi-valve (6) under test, respectively;

Step 9: adjusting the control current of the first proportional pressure reducing valve (8) to be zero, so that the first commutation linkage (6.1) of the load-sensitive multi-path valve (6) under test returns to a neutral position;

Step 10: gradually increasing the control current of the first proportional pressure reducing valve (8) so that the first commutation linkage (6.1) of the load-sensitive multi-path valve (6) under test gradually commutates, adjusting the second proportional relief valve (12) so that the pressure of the B1 port of the load-sensitive multi-path valve (6) is 25%, 50%, 75% or 100% of the rated pressure, and repeating step 7 to step 9 once;

S4: performing a micro-motion characteristic test respectively on two commutation positions of other commutation linkages in accordance with the method in S3.

7. A load-sensitive multi-path valve testing method, characterized in that the load-sensitive multi-path valve testing method comprises a load-sensitive multi-path valve testing device according to any one of claims 1 to 4, the specific steps of the load-sensitive multi-path valve testing method being as follows:

S1: switching on the electronically controlled variable displacement pump (1) and gradually increasing a control current of the first proportional relief valve (3) so that an output pressure of the electronically controlled variable displacement pump (1) is a rated pressure of the load-sensitive multi-path valve (6) under test;

S2: adjusting a control current of the electro-hydraulic proportional valve (2) built in the electronically controlled variable displacement pump (1) by PID to control the output flow of the electronically controlled variable displacement pump (1), so that a pressure difference between an output pressure P of the electronically controlled variable displacement pump (1) and a pressure of the load feedback LS port is a constant pressure difference, and at the same time limiting a maximum output flow of the electronically controlled variable displacement pump (1) to be lower than a rated flow of the load-sensitive multi-path valve (6) under test;

S3: performing a flow saturation resistant characteristic test on two commutation positions of the first commutation linkage (6.1), the specific steps being as follows:

Step 1: adjusting a control current of the fourth proportional pressure reducing valve (28) to a maximum current so that the first commutation linkage (6.1) of the load-sensitive multi-valve (6) under test is fully commutated, adjusting a control current of the third proportional relief valve (13) so that a pressure of the A1 port of the load-sensitive multi-path valve (6) is unloaded, gradually increasing a control current of the third proportional pressure reducing valve (26) so that the second commutation linkage (6.2) of the load-sensitive multi-valve (6) under test gradually commutates, and adjusting the fifth proportional relief valve (21) so that the pressure of the A2 port of the load-sensitive multi-path valve (6) is unloaded, 25%, 50%, 75% or 100% of the rated pressure for testing;

Step 2: recording a flow of the A1 port of the load-sensitive multi-path valve (6) under test which is a value of the third flow sensor (14), a pressure of the P port of the load-sensitive multi-valve (6) under test which is a value of the second pressure sensor (7), a pressure of the A1 port of the load-sensitive multi-path valve (6) under test which is a value of the fourth pressure sensor (15), a pressure of the load feedback LS port of the load-sensitive multi-valve (6) under test which is a value of the third pressure sensor (24), a flow of the A2 port of the load-sensitive multi-valve (6) under test which is a value of the fourth flow sensor (22), a pressure of the A2 port of the load-sensitive multi-path valve (6) under test which is a value of the seventh pressure sensor (23), and a pressure of the a2 port of the load-sensitive multi-path valve (6) under test which is a value of an eleventh pressure sensor (25), respectively;

Step 3: drawing curves presented by the pressure of the a2 port of the load-sensitive multi-valve (6) under test versus the pressure of the P port, the pressure of the load feedback LS port, the flow of the A1 port, the pressure of the A1 port, the flow of the A2 port and the pressure of the A2 port of the load-sensitive multi-valve (6) under test, respectively;

Step 4: adjusting a control current of the third proportional pressure reducing valve (26) to a maximum current so that the second commutation linkage (6.2) of the load-sensitive multi-valve (6) under test is fully commutated, adjusting a control current of the fifth proportional relief valve (21) so that a pressure of the A2 port of the load-sensitive multi-path valve (6) is unloaded, gradually increasing a control current of the fourth proportional pressure reducing valve (28) so that the first commutation linkage (6.1) of the load-sensitive multi-valve (6) under test gradually commutates, and adjusting the third proportional relief valve (13) so that the pressure of the A1 port of the load-sensitive multi-path valve (6) is unloaded, 25%, 50%, 75% or 100% of the rated pressure for testing;

Step 5: recording the flow of the A1 port of the load-sensitive multi-path valve (6) under test which is a value of the third flow sensor (14), the pressure of the P port of the load-sensitive multi-valve (6) under test which is a value of the second pressure sensor (7), the pressure of the A1 port of the load-sensitive multi-path valve (6) under test which is a value of the fourth pressure sensor (15), the pressure of the load feedback LS port of the load-sensitive multi-valve (6) under test which is a value of the third pressure sensor (24), the flow of the A2 port of the load-sensitive multi-valve (6) under test which is a value of the fourth flow sensor (22), the pressure of the A2 port of the load-sensitive multi-path valve (6) under test which is a value of the seventh pressure sensor (23), and the pressure of the a1 port of the load-sensitive multi-path valve (6) under test which is a value of the eleventh pressure sensor (25), respectively;

Step 6: drawing curves presented by the pressure of the a1 port of the load-sensitive multi-valve (6) under test versus the pressure of the P port, the pressure of the load feedback LS port, the flow of the A1 port, the pressure of the A1 port, the flow of the A2 port and the pressure of the A2 port of the load-sensitive multi-valve (6) under test, respectively.

* * * * *